United States Patent
Ichiki et al.

(10) Patent No.: US 7,072,907 B2
(45) Date of Patent: Jul. 4, 2006

(54) INFORMATION PROVIDING SYSTEM AND MEDIATING APPARATUS

(75) Inventors: Hiroki Ichiki, Kawasaki (JP); Toshihiro Ide, Fukuoka (JP); Takao Mohri, Kawasaki (JP); Satoru Ushijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 457 days.

(21) Appl. No.: 09/808,357

(22) Filed: Mar. 15, 2001

(65) Prior Publication Data

US 2001/0044806 A1 Nov. 22, 2001

(30) Foreign Application Priority Data

May 9, 2000 (JP) ......................................... 2000-135397

(51) Int. Cl.
*G06F 17/30* (2006.01)
*G06F 7/00* (2006.01)

(52) U.S. Cl. .................... 707/104.1; 707/6; 707/203
(58) Field of Classification Search ................. 707/1–4, 707/10, 100, 102, 103 R, 200, 201, 6, 101, 707/103, 203, 104.1; 709/201, 203; 717/172
See application file for complete search history.

(56) References Cited

U.S. PATENT DOCUMENTS

| 5,892,909 A | * | 4/1999 | Grasso et al. ................ 709/201 |
| 6,085,198 A | * | 7/2000 | Skinner et al. .......... 707/103 R |
| 6,188,695 B1 | * | 2/2001 | Przybysz ..................... 709/242 |

* cited by examiner

*Primary Examiner*—Frantz Coby
*Assistant Examiner*—Marc Filipczyk
(74) *Attorney, Agent, or Firm*—Staas & Halsey LLP

(57) ABSTRACT

There is disclosed an information providing system having a mediator adapted for receiving renewal information for an index from information servers or information sources to select the received renewal information in accordance with index selection condition. The mediator sends the selected renewal information to a retrieval engine.

15 Claims, 11 Drawing Sheets

| ATTRIBUTE・CATEGORY | ADDRESS |
|---|---|
| <PUSH PROGRAM, AMUSEMENT> | www.SportsServer.co.jp<br>www.MusicServer.co.jp |
| <PUSH PROGRAM, PERSONAL COMPUTER> | www.PcServer.co.jp |
|  |  |
|  |  |
|  |  |

INFORMATION PROVIDING SYSTEM AND MEDIATING APPARATUS

BACKGROUND OF THE INVENTION

1. Field of the Invention

The present invention relates to an information providing system comprising an information server for providing information upon receipt of request of the information, and a retrieval engine for retrieving an information server capable of providing information requested, and a mediating apparatus for constructing the information providing system.

2. Description of the Related Art

Hitherto, there is known an information providing system having, as an information source, information servers and homepages, distributed on a network such as the Internet, for providing information by the information source. It often happens that such an information providing system is provided with a retrieval engine for retrieving a desired piece of information so that a user of the system can easily to find the desired piece of information.

The retrieval engine stores an index representative of an information group capable of providing information servers and homepages so that information is effectively retrieved, and retrieves information using the index.

Generally, information provided from the information servers and the like constituting the information providing system is often renewed. And thus, there is a need to renew the index to retrieve the up-to-date information by the retrieval engine. As a scheme of renewing the index, hitherto, there are known a plurality of schemes as will be described hereinafter.

First, there is known a so-called PULL scheme.

FIG. 1 is an illustration showing an information providing system for performing a renewal of the index in accordance with the PULL scheme.

FIG. 1 shows an information providing system 1 comprising three information servers 2 and two retrieval engines 3. A user 4 of the information providing system 1 accesses the information servers 2 and the retrieval engines 3 via the Web browser 4a to receive an introduction of the information server and the provision of information.

According to the information providing system 1 shown in FIG. 1, the retrieval engine 3 suitably accesses the information servers 2, so that the index stored in oneself is compared with an information group capable of being provided by the information servers 2 to check accuracy of the index. In the event that the index is inaccurate, the retrieval engine 3 collects from the information servers 2 a renewal information in which the information group capable of being provided by the information servers 2 is represented in the form of a difference from the current index, and renews the index stored in oneself in accordance with the renewal information. This is a renewal of the index according to the PULL scheme.

To always maintain accuracy of the index, it is necessary to promptly collect renewal information whenever information capable of being provided by the information servers 2 is renewed. However, in a network such as the Internet, there exists a large number of information servers 2, and it often happens that the information servers 2 are added or deleted per se. Thus, according to the PULL scheme, it is very difficult to always grasp a present situation of the information servers 2 at the end of the retrieval engine 3. Further, to always maintain accuracy of the index, it would impose a great burden on a manager and a system of the retrieval engine 3.

As a scheme of solving disadvantages of the PULL scheme, there is shown a so-called PUSH scheme.

FIG. 2 is an illustration showing an information providing system for performing a renewal of the index in accordance with the PUSH scheme.

In a similar fashion to that of the information providing system 1 shown in FIG. 1, an information providing system 5 shown in FIG. 2 also comprises the information servers 2 and the retrieval engines 3. According to the information providing system 5 shown in FIG. 2, each of the information servers 2 incorporate therein a push program 6 for automatically producing renewal information and sending the same to the retrieval engines 3.

The push program 6 of each of the information servers 2 produces the renewal information and sends the same to the retrieval engines 3 when the information group capable of being provided by the information servers 2 is altered. Sending the renewal information is referred to as "push". The retrieval engine 3 renews the index of oneself upon receipt of the renewal information pushed by the information servers 2. This is the renewal of the index according to the PUSH scheme. According to the PUSH scheme, the index stored in the retrieval engine 3 is always an exact index, and thus the user 4 can receive a high quality of retrieval service according to the exact index.

By the way, in general, an information providing system incorporates therein a plurality of types of retrieval engines that are mutually different in a retrieval method of information and in a field of information to be retrieved. Each of the plurality of types of retrieval engines stores an index for the associated retrieval engine. For this reason, according to the information providing system 5 shown in FIG. 2, the push program 6 of each of the information servers 2 produces the renewal information and sends the same to the retrieval engines 3. As retrieval service is expanded or altered in an information providing system, it is expected that a retrieval engine is added or altered.

In the event that such supplement and alteration of the retrieval engine occurs, in the information providing system 5 shown in FIG. 2, for the purpose of producing the renewal information for the retrieval engine involved in the supplement and alteration, there is a need for a manager and the like of each of the information servers 2 to newly produce the push program 6 of each of the information servers 2. However, the manager and the like of each of the information servers 2 is not always skilled in the retrieval engine involved in the supplement and alteration, and thus in general a production of the push program 6 is a great burden for the manager and the like of each of the information servers 2.

In view of the foregoing, there is considered a system in which a push program is distributed via a network to be incorporated into information servers.

FIG. 3 is an illustration showing an information providing system in which a push program is distributed via a network.

In a similar fashion to that of the information providing systems 1 and 5 shown in FIGS. 1 and 2, an information providing system 7 shown in FIG. 3 also comprises the information servers 2 and the retrieval engines 3. According to the information providing system 7 shown in FIG. 3, each of the information servers 2 is provided with a platform 8 for receiving a push program 6 from a network to incorporate the same into the associated information server 2.

According to the information providing system 7 shown in FIG. 3, the push program 6 for each of the retrieval engines 3 is distributed from the associated retrieval engine 3 and a management center (not illustrated) via a network to the platform 8 of each of the information servers 2, so that the push program 6 thus distributed is incorporated into the information server 2 through the platform 8. The push program 6 thus incorporated produces, in a similar fashion to that of FIG. 2, the renewal information and sends the same to the associated retrieval engine.

In the event that a retrieval engine is supplemented to the information providing system 7 shown in FIG. 3, the push program for the supplemented retrieval engine is produced by a person skilled in the retrieval engine, for example, a manager of the retrieval engine and an engineer of a management center, and the push program thus produced is distributed via a network to the platforms 8 of the respective information servers 2.

Thus, the information providing system 7 shown in FIG. 3 can cope with the supplement and alteration of the retrieval engine.

By the way, in the future, it is desired to constitute an information providing system provided with a number of retrieval engines, in which retrieval services of the respective retrieval engines are specialized. For example, it is desired to provide a private retrieval engine for the user 4. Thus, in the event that such a number of retrieval engines are provided for the information providing system 7 shown in FIG. 3, it is needed that a number of push programs 6 for each of such a number of retrieval engines are incorporated into all the information servers 2 constituting the information providing system 7 so that a number of pieces of renewal information is pushed in accordance with such a number of push programs 6. This imposes a great burden on the information servers 2.

In the event that such a number of push programs 6 are produced on a batch basis in a management center and the like and then distributed, it would impose a great burden on the management center. In the event that a manager on each retrieval engine produces and distributes the push program 6 for one's own retrieval engine, there is a high possibility that it is difficult to produce and distribute the push program 6 suitable for the respective information servers, for example, since the manager for the private retrieval engine is the user 4 as a private person.

SUMMARY OF THE INVENTION

In view of the foregoing, it is an object of the present invention to provide an information providing system capable of incorporating therein a number of retrieval engines while suppressing a burden of the retrieval engines and information sources, and a mediating apparatus for constructing such an information providing system.

To achieve the above-mentioned object, the present invention provides an information providing system comprising:

a plurality of information sources each having both an information providing function of providing information upon receipt of a request for providing information and an index output function of outputting an individual index representative of an information group capable of being provided by oneself;

a retrieval engine having an index construction function of finally receiving at least one individual index outputted by the index output function of at least one information source to construct a general index representative of information group capable of being provided by at least one information source, and an information retrieval function of retrieving information upon receipt of a request for retrieving information with the general index constructed by the index construction function; and a mediating apparatus intervening between said information sources and said retrieval engine adapted for receiving a plurality of individual indexes outputted from said plurality of information sources to select an individual index satisfying a predetermined index selection condition from among the plurality of individual indexes thus received, said mediating apparatus sending the selected individual index to said retrieval engine for use in the index construction function.

Further, to achieve the above-mentioned object, the present invention provides a mediating apparatus comprising:

an index receiving section for receiving a plurality of individual indexes outputted by a plurality of information sources each having both an information providing function of providing information upon receipt of a request for providing information and an index output function of outputting an individual index representative of an information group capable of being provided by oneself;

an index selection section for selecting an individual index satisfying a predetermined index selection condition from among the plurality of individual indexes received by said index receiving section; and an index sending section for sending the individual index selected by said index selection section to a retrieval engine for use in an index construction function, said retrieval engine having the index construction function of finally receiving at least one individual index outputted by the index output function of at least one information source to construct a general index representative of information group capable of being provided by at least one information source, and an information retrieval function of retrieving information upon receipt of a request for retrieving information with the general index constructed by the index construction function.

Any one is acceptable, as the "information source", which is provided with the information providing function and the index output function. It is acceptable that the "information source" is a so-called information server, or a homepage and the like.

It is acceptable that the "individual index" is one that represents the information group capable of being provided by oneself in its entirety. Alternatively, in the event that the information group capable of being provided is varied on a time basis, it is acceptable that the "individual index" is one in which the present information group is represented by the corresponding variation from the past information group.

It is acceptable that the mediating apparatus is constructed in form of a united hardware. Alternatively, it is acceptable that a plurality of individual mediating apparatuses, which mutually receive and transmit indexes and the index selection conditions therebetween, are constructed on a network on a distributing basis.

According to the present invention, an index outputted by the information source is selected in accordance with an index selection condition by a mediating apparatus and is sent to a retrieval engine. Even if a number of retrieval engines are incorporated, simply preparing the associated index selection condition for each retrieval engine makes it possible to suitably send the index to the respective retrieval engine, and thereby reducing burdens of the retrieval engine, the information source and the mediating apparatus.

Users for the retrieval engines specified in a retrieval service, as mentioned above, are generally a few. Needs, which is required in the retrieval service by such a few users, is frequently varied. Particularly, in case of the retrieval engine for a private user, such a variation of needs is notable. Thus, in the event that needs are frequently varied, the index to be collected by the retrieval engine is also frequently varied. However, according to the present invention, simply altering the index selection condition causes an index sent to the retrieval engine to be altered. Thus, even if needs are frequently varied, there are reduced burdens of the retrieval engine, the information source and the mediating apparatus.

In the information providing system of the present invention, it is preferable that a plurality of said retrieval engines is provided, each engine registering with said mediating apparatus an index selection condition for selecting the individual index transmitted to oneself, and said mediating apparatus selects an individual index satisfying the index selection condition registered by an retrieval engine from among a plurality of indexes outputted by said information source and sends the selected individual index to the retrieval engine.

In the mediating apparatus according to the present invention as mentioned above, it is preferable that a plurality of said retrieval engines is provided, said mediating apparatus further comprises an index selection condition storage section for storing the index selection condition in association with said retrieval engine upon receipt of a request for registration of the index selection condition by said retrieval engine, said index selection section selects an individual index satisfying an index selection condition stored in said index selection condition storage section, and said index sending section sends the individual index selected by said index selection section to a retrieval engine associated with the index selection condition used in selection of the individual index, of the plurality of retrieval engines.

According to the information providing system and the mediating apparatus having such preferable structures as mentioned above, it is very easy to perform supplement and alteration of the index selection condition, and thus it is possible to readily cope with supplement and alteration of retrieval engines.

In the information providing system of the present invention as mentioned above, it is preferable that said information sources each has, as the index output function, a function of receiving a push program defining a method of producing and outputting the individual index to produce and output the individual index in accordance with the method defined by the push program, and the said mediating apparatus receives push programs, selects a push program satisfying a predetermined program selection condition from among the received push program, and sends the selected push program to the information source for use in the index output function, as well as receiving the individual index and sending the same to the retrieval engine.

In the mediating apparatus of the present invention as mentioned above, it is preferable that said information sources each has, as the index output function, a function of receiving a push program defining a method of producing and outputting the individual index to produce and output the individual index in accordance with the method defined by the push program, and said mediating apparatus further comprises a program receiving section for receiving the push program, a program selection section for selecting a push program satisfying a predetermined program selection condition from among the push programs received by said program receiving section, and a program sending section for sending the push program selected by said program selection section to said information source for use in the index output function.

As mentioned above, according to the present invention, it is possible to cope with supplements of the retrieval engines by means of alteration of the index selection condition. However, for example, in the event that a retrieval engine, which desires a more detailed index than an index produced by the present push program, is supplemented, or in the event that a new server system is developed, a renewal of the push program is needed. Thus, there is provided one in which a mediating apparatus mediates the push program. This makes it easy to renew the push program, and thereby reducing labor for the maintenance or the like of the push program.

Thus, in case of one in which a mediating apparatus mediates the push program, in the information providing system of the present invention, it is preferable that each the information source registers with said mediating apparatus a program selection condition for selecting the push program transmitted to oneself, and said mediating apparatus selects a push program satisfying the program selection condition registered by the information source.

Further, in case of one in which a mediating apparatus mediates the push program, in the mediating apparatus according to the present invention as mentioned above, it is preferable that said mediating apparatus further comprises a program selection condition storage section for storing the program selection condition in association with said information source upon receipt of a request for registration of the program selection condition by said information source, said program selection section selects a push program satisfying a program selection condition stored in said program selection condition storage section, and said program sending section sends the push program selected by said program selection section to an information source associated with the program selection condition used in selection of the push program.

According to the information providing system and the mediating apparatus as mentioned above, the information server registers the program selection condition according to the machine type of oneself. Thus, a manager or the like of the information providing system may make up only the push programs each meeting the type of the respective information server and sends the same to the mediating apparatus, without necessity for grasp of systems of individual information servers, so that the suitable push programs are transmitted to the respective servers. Accordingly, a manager or the like of the information providing system can remarkably readily perform the maintenance of the push programs.

DETAILED DESCRIPTION OF PREFERRED EMBODIMENTS

Embodiments of the present invention will be described with reference to the accompanying drawings.

Figure 4:
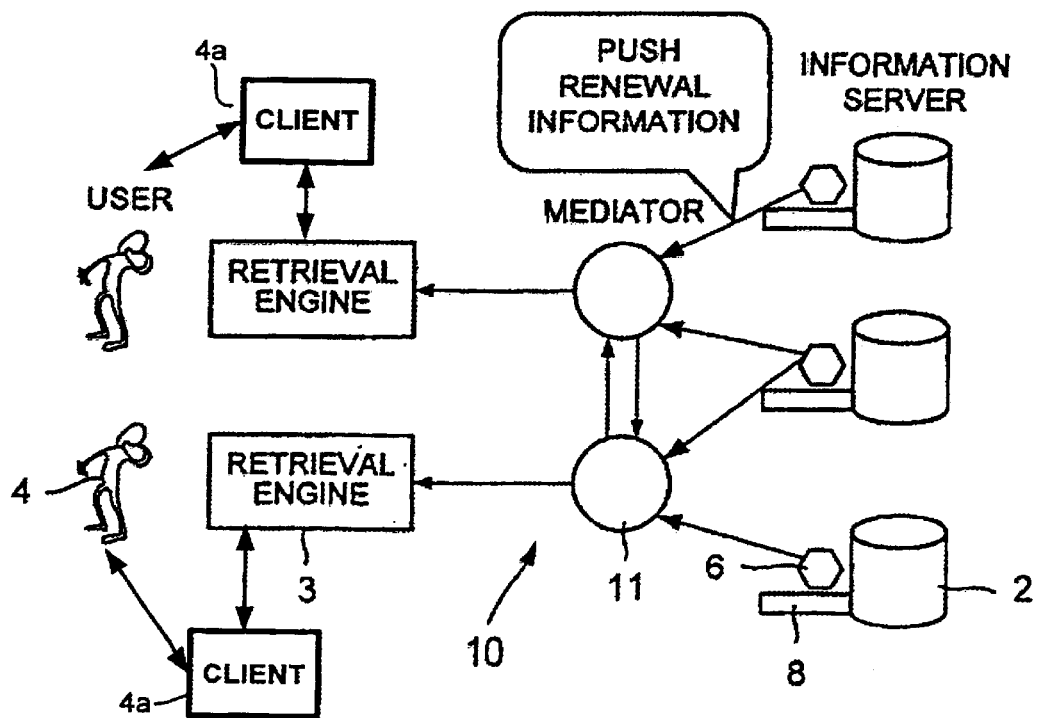
FIG. 4 is an illustration showing an embodiment of an information providing system according to the present invention.

FIG. 4 is an illustration showing an embodiment of an information providing system according to the present invention.

Figure 1:
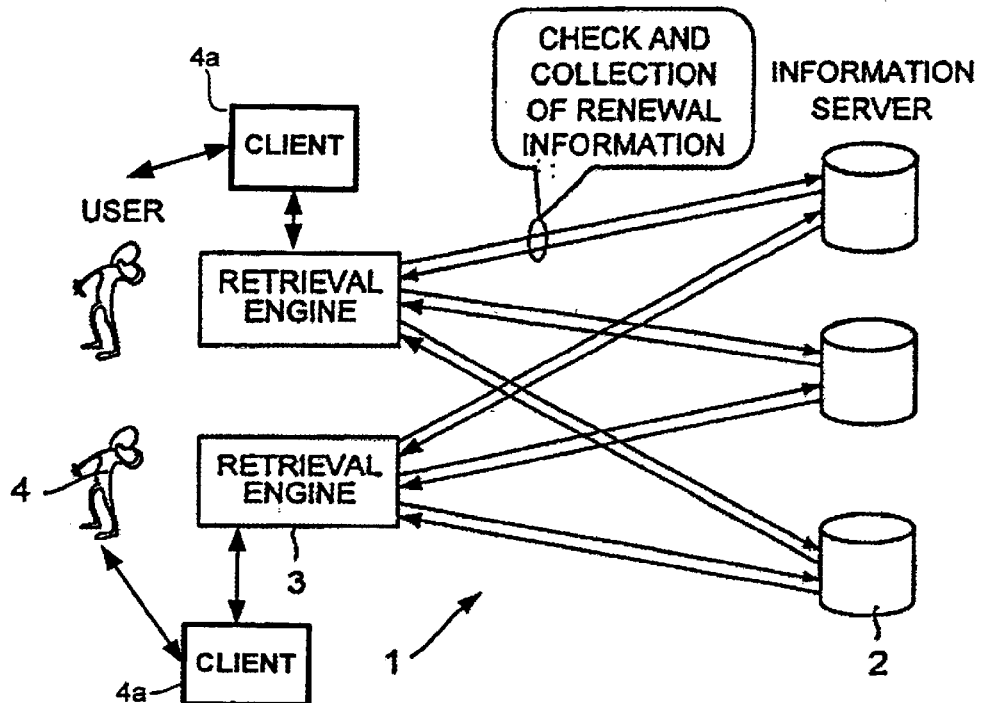
FIG. 1 is an illustration showing an information providing system for performing a renewal of the index in accordance with the PULL scheme.
Figure 2:
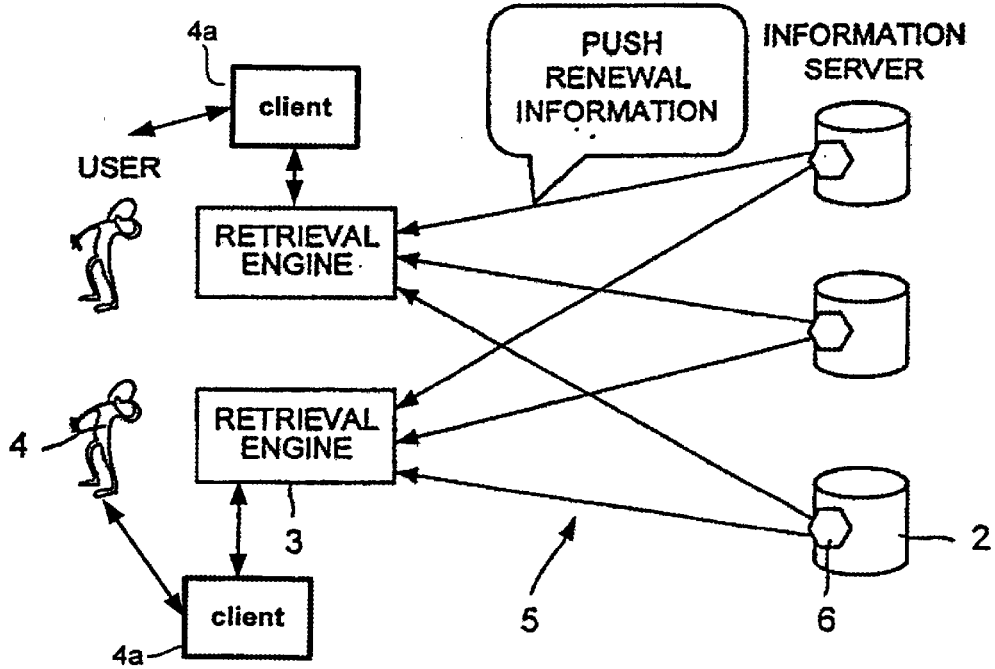
FIG. 2 is an illustration showing an information providing system for performing a renewal of the index in accordance with the PUSH scheme.
Figure 3:
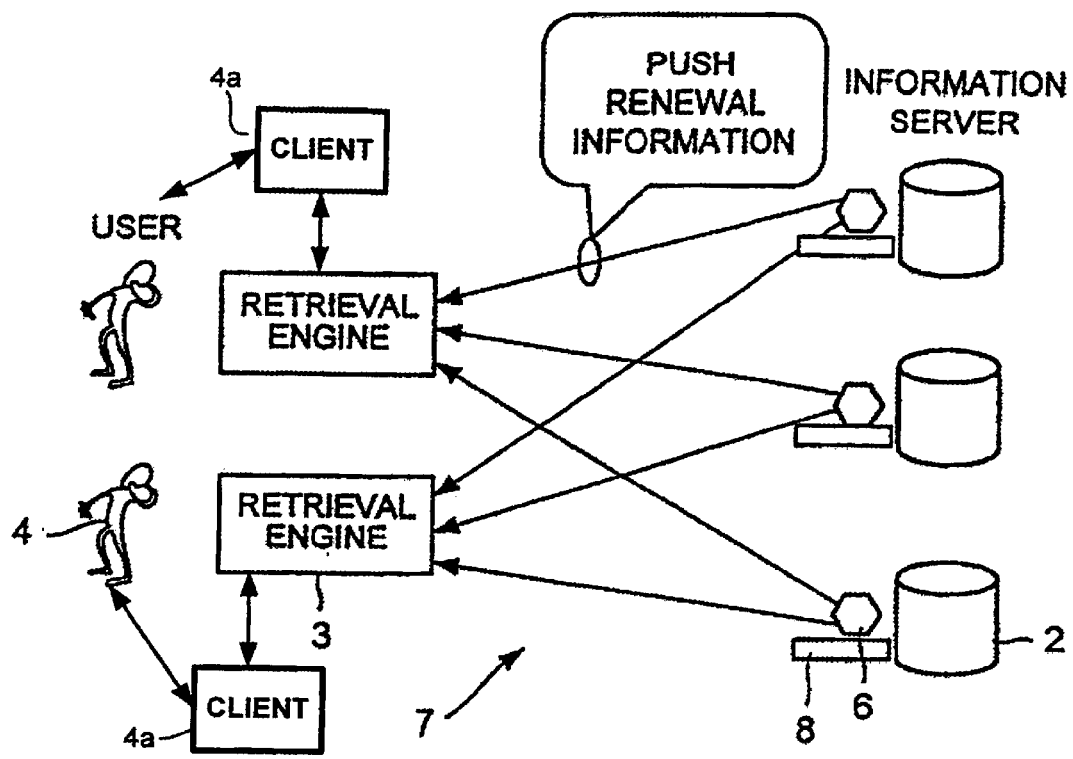
FIG. 3 is an illustration showing an information providing system in which a push program is distributed via a network.

An information providing system 10 shown in FIG. 4 is an embodiment of an information providing system according to the present invention. In a similar fashion to that of the information providing systems 1, 5 and 7 shown in FIGS. 1, 2 and 3, the information providing system 10 shown in FIG. 4 also comprises the information servers 2 and the retrieval engines 3. The information server 2 corresponds to an example of the information source referred to in the present invention. The information providing system 10 shown in FIG. 4 is provided with a mediator 11 for mediating the transmission of renewal information which is an example of the index referred to in the present invention. The mediator 11 corresponds to the embodiment of the mediating apparatus of the present invention. FIG. 4 typically shows three information servers 2, two retrieval engines 3, and two mediators 11. Of course, the number of information sources and the like referred to in the present invention are not restricted to those numbers as noted above.

Those information servers 2, retrieval engines 3, and mediators 11 are provided on the Internet for example. In the event that the retrieval engine 3 is a private retrieval engine for the user 4, the retrieval engine 3 is Incorporated into for example, a client machine of the user 4.

According to the information providing system 10 shown in FIG. 4, the user 4 accesses the information server 2 via Web browser (not illustrated) to request a provision of information, so that the information server 2 thus accessed provides the requested information. That is, this information server 2 is provided with a function of an information providing function referred to in the present invention. Further, according to the information providing system 10 shown in FIG. 4, the push program 6 of each of the information servers 2 pushes renewal information. The renewal information corresponds to an example of the individual index referred to in the present invention. The information server 2 is also provided with an index outputting function referred to in the present invention.

The mediator 11 selects, from among the renewal information pushed by the information server 2, the renewal information satisfying the index selection condition referred to in the present invention, and sends the same to the retrieval engines 3. Accordingly, even if the push program 6 of the information server 2 is of a general type, the renewal information, which is suitable for the respective the retrieval engines 3, is transmitted to the retrieval engines 3.

Each of the retrieval engines 3 receives the renewal information from the mediator 11, and renews the index stored in oneself in accordance with the received renewal information. That is, each of the retrieval engines 3 is provided with the index constructing function referred to in the present invention, so that the index of one's own is constructed in accordance with the renewal information received from the mediator 11. The user 4 accesses the retrieval engine 3 via the Web browser (not shown) to request a retrieval of information. The retrieval engine 3 retrieves the information using the index stored in oneself to show the user 4 the retrieval result via the Web browser and the like. That is, the retrieval engine 3 is also provided with the information retrieval function referred to in the present invention.

According to the information providing system of the present invention, even if the retrieval engine is supplemented, simply performing supplements of the index selection condition makes it possible to readily cope with the supplement of the new retrieval engine. Thus, the distribution of the push program is not always needed. But, for the purpose of making it easy to perform the maintenance or the like of the push programs 6, in the information providing system of the present embodiment, each of the information servers 2 is provided with the platform 8, on a similar fashion to that of FIG. 3, and each of the mediators 11 mediates also a distribution of the push programs 6.

Figure 5:
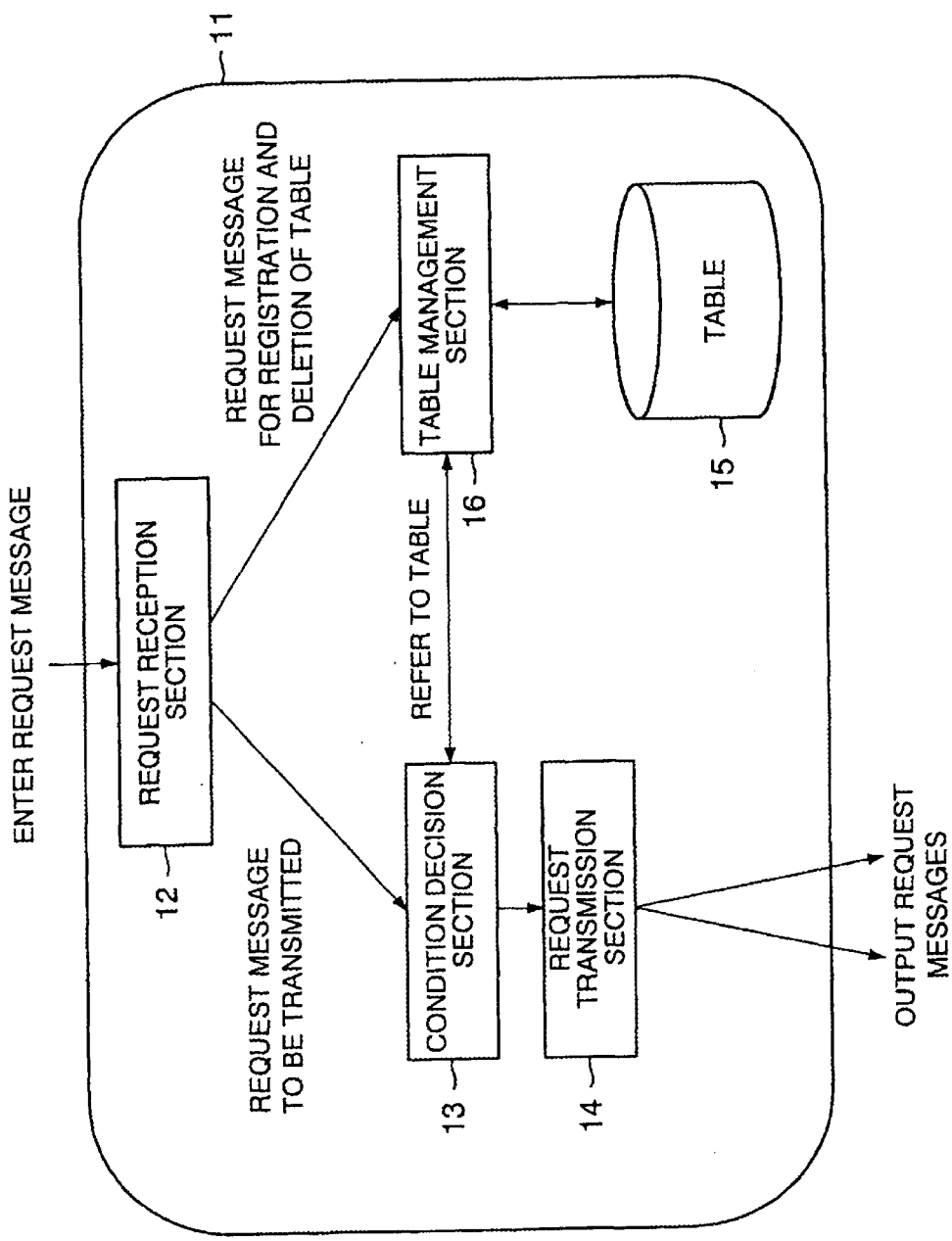
FIG. 5 is a view showing a structure of a mediator.

FIG. 5 is a view showing a structure of a mediator.

The mediator 11 comprises: a request reception section 12, which is an example of the program receiving section referred to in the present invention as well as an example of the index receiving section referred to in the present invention; a condition decision section 13, which is an example of the program selection section referred to in the present invention as well as an example of the index selection section referred to in the present invention; and a request transmission section 14, which is an example of the program sending section referred to in the present invention as well as an example of the index sending section referred to in the present invention.

The request reception section 12 receives a request message for requesting of a retrieval engine the storage of renewal information and a request message for requesting of a platform of an information server a registration of the push program, and transmits the renewal information and the push program to the condition decision section 13.

The condition decision section 13 selects, from among the renewal information and the push program thus received, the renewal information and the like, which satisfies a condition which will be described later, and transmits to the request transmission section 14 the selected one together with the associated request message.

The request transmission section 14 outputs the received renewal information and request message toward an address, which will be described later.

In this manner, the mediator 11 mediates the transmission of the renewal information and the distribution of the push program.

According to the present embodiment, the mediator 11 further comprises a table storage section 15 and a table management section 16. The table storage section 15 and the table management section 16 constitute an example serving both as an example of the index selection condition storage section and an example of the program selection condition storage section. The request reception section 12 receives a request message for requesting registrations of the index selection condition and the program selection condition, and transmits the same to the table management section 16.

The table storage section 15 stores a table for providing an association between the index selection condition referred to in the present invention and an address of the renewal information, and also an association between the program selection condition referred to in the present invention and an address of the push program.

The table management section 16 performs, upon receipt of a request for registration and deletion of the program selection condition from the information servers 2, or a request for registration and deletion of the index selection condition from the retrieval engine 3, renewals of the table stored in the table storage section 15 in accordance with the requests.

To select the renewal information or the push program, the condition decision section 13 refers to the table of the table storage section 15 via the table management section 16, and selects the renewal information and the like satisfying the condition described in the table. The request transmission section 14 outputs the renewal information and the like toward an address described in the table in association with the condition used in selection of the renewal information and the like.

Hereinafter, there will be described a transmission procedure of the renewal information and a distribution procedure of the push program in an information providing system.

FIG. 4 shows a plurality of mediators 11. According to the present embodiment, the plurality of mediators 11 serves as a mediating apparatus in their cooperation. For the sake of convenience, first, there will be described a case in which a single mediator 11 serves as a mediating apparatus, and thereafter, there will be described a case in which a plurality of mediators 11 serves as a mediating apparatus in their cooperation.

In the event that renewal information is transmitted in the information providing system shown in FIG. 4, there is a need to distribute the push program beforehand. Accordingly, first, there will be described the distribution procedure of the push program.

In the event that the push program is distributed in an information providing system, it is needed prior to a distribution of the push program that the program selection condition referred to in the present invention is registered with the mediator 11. As to the program selection condition, each of the information servers causes the program selection condition for oneself to be registered with the mediator 11. According to the present embodiment, as mentioned above, the program selection condition is registered with the table of the table storage section.

Figures 6, 7:
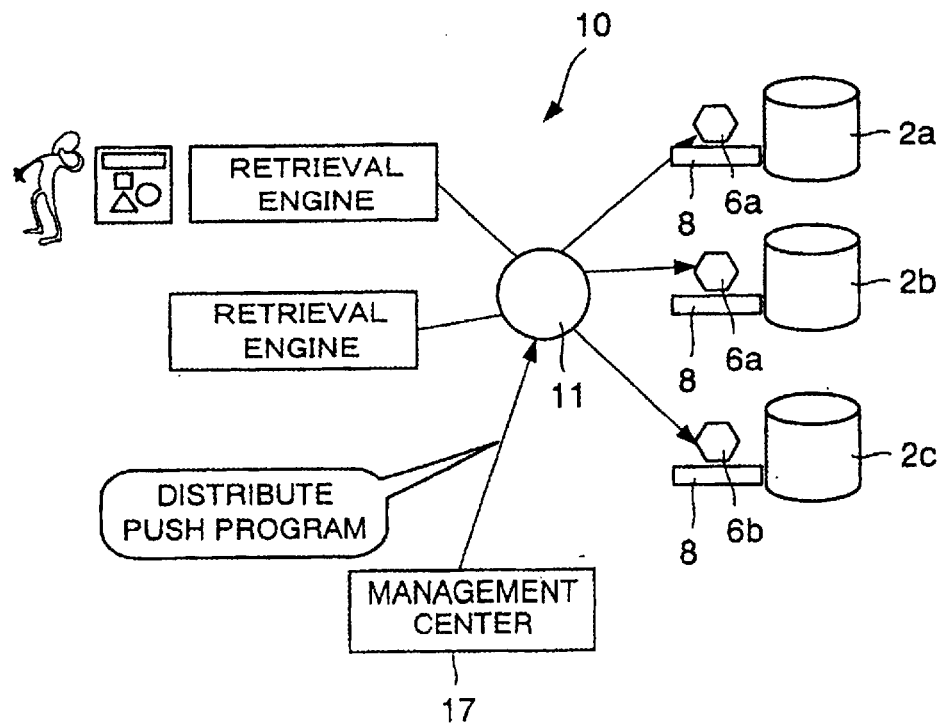
FIG. 6 is a view showing an example of a table stored in a table storage section of the mediator.
FIG. 7 is a view showing a state that a push program is distributed in an information providing system according to the embodiment of the present invention.

FIG. 6 is a view showing an example of a table stored in a table storage section of the mediator.

On an address column 21 of a table 20, there is described an address of the information server who requests a distribution of the push program. In FIG. 6, there are shown, by way of example, an address "www.SportsServer.co.jp" of the information server who provides a sport information, an address "www.MusicServer.co.jp" of the information server who provides a music information, and an address "www-.PcServer.co.jp" of the information server who provides information of a personal computer.

On an attribute and category column 22 of the table 20, there is described an attribute common to the push program of which a distribution is desired by the information server indicated by the address described in the address column 21. The address described in a stage 23 is associated with the attribute described in the same stage 23. A mediator selects only the push program having the attribute described in the attribute and category column 22, and transmits the same to the information server of the address associated with the attribute. Accordingly, the attribute described in the attribute and category column 22 is an example of the program selection condition referred to in the present invention.

In FIG. 6, there are shown, by way of example, attributes "amusement" and "personal computer", which are representative of the push programs suitable for producing the renewal information with respect to amusement information and personal computer information, respectively. As other types of attribute, there are considered, for example, an attribute representative of the push program suitable for being incorporated into a predetermined machine type of information server, and an attribute representative of the push program suitable for producing the renewal information in a predetermined frequency or a predetermined detail.

FIG. 7 is a view showing a state that a push program is distributed in an information providing system according to the embodiment of the present invention.

An explanation will be made on the assumption that the information providing system 10 is provided with an information server 2a for providing sport information, an information server 2b for providing music information and an information server 2c for providing information as to a personal computer.

FIG. 7 shows a management center 17 of the information providing system 10. An engineer of the management center 17 produces, for example, a push program 6a involved in the attribute "amusement" and a push program 6b involved in the attribute "personal computer". Those push programs 6a and 6b are outputted from the management center 17 to the mediator 11 together with data representative of the attributes, respectively.

Upon receipt of the push programs 6a and 6b, the mediator 11 compares the attributes of the push programs 6a and 6b with the attributes described on the table shown in FIG. 6. In accordance with a result of matching, the mediator 11 sends the push program 6a involved in the attribute "amusement" to two the information servers 2a and 2b, and the push program 6b involved in the attribute "personal computer" to the information server 2c. Thus, the push programs 6a and 6b suitable for the information servers 2a, 2b and 2c are automatically distributed to the platforms 8 of the information servers 2a, 2b and 2c.

Next, there will be described a transmission procedure of the renewal information in the information providing system 10. In the event that the renewal information is transmitted in the information providing system 10, there is a need that the index selection condition referred to in the present invention is registered with the mediator 11 prior to transmission of the renewal information. As to the index selection condition, each of the retrieval engines registers the associated one for oneself. According to the present embodiment, as mentioned above, the index selection condition is also registered with the table of the table storage section.

Figure 8:
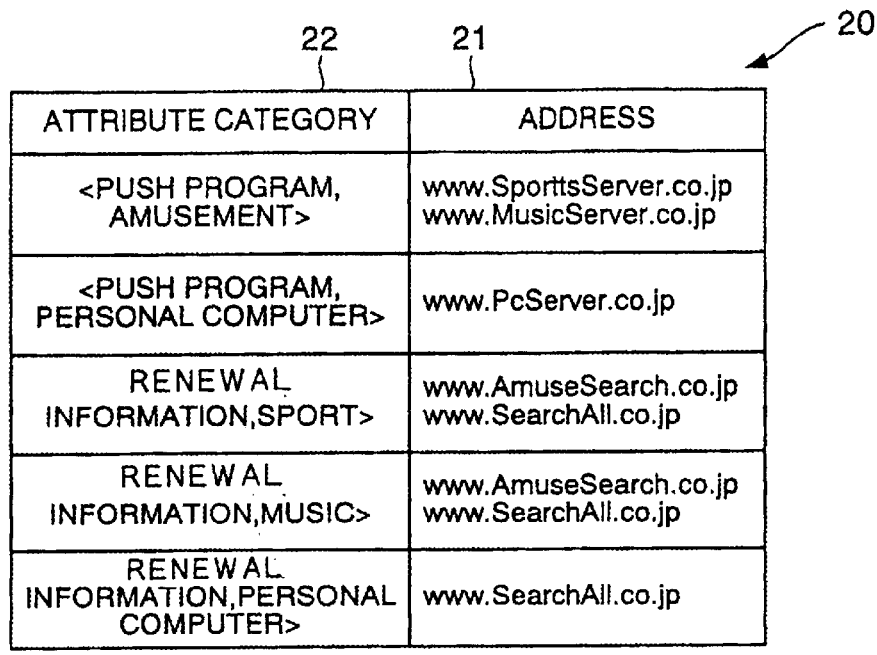
FIG. 8 is a view showing a state that an index selection condition is added into the table shown in FIG. 6.

FIG. 8 is a view showing a state that an index selection condition is added into the table shown in FIG. 6.

In an address column 21 of a table 20 shown in FIG. 8, there are additionally described addresses of retrieval engines, which require transmission of the renewal information. In FIG. 8, there are shown, by way of example, address "www.AmuseSearch.co.jp" of the retrieval engine, which performs the retrieval service for the amusement information, and address "www.SearchAll.co.jp" of the retrieval engine, which performs the retrieval service for all information fields.

In an attribute and category column 22, a category of the renewal information of which a distribution is desired by the retrieval engine indicated by the address described in the address column 21 is described in association with the address of the retrieval engine. The mediator selects only the information belonging to the category described in the attribute and category column 22, and sends the same to the retrieval engine. Accordingly, the category described in the attribute and category column 22 is an example of the index selection condition referred to in the present invention.

Figure 9:
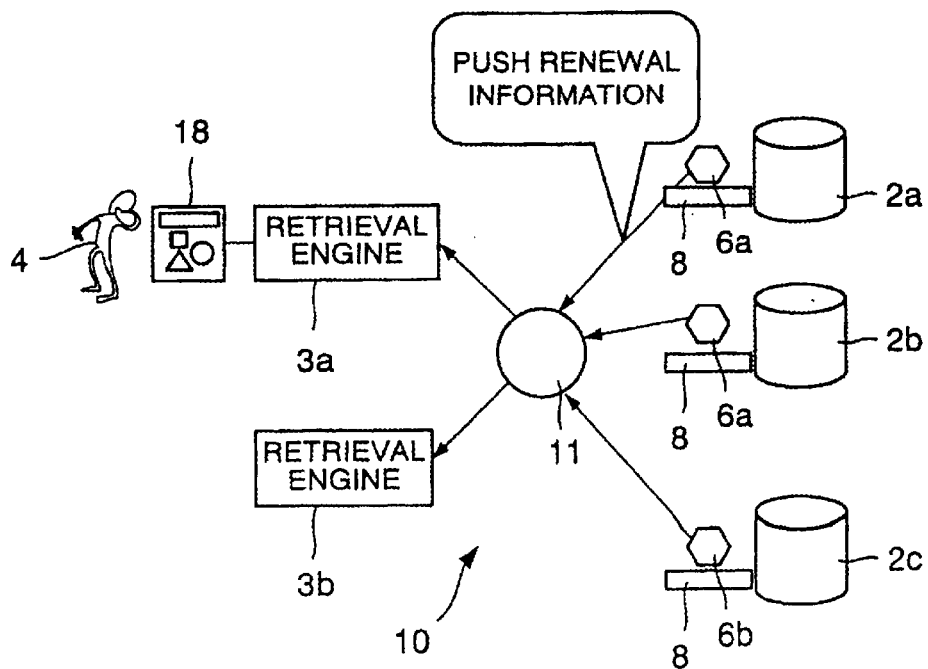
FIG. 9 is a view showing a state that renewal information is transmitted in the information providing system shown in FIG. 7.

FIG. 9 is a view showing a state that renewal information is transmitted in the information providing system shown in FIG. 7.

An explanation will be made on the assumption that the information providing system 10 is provided with a retrieval engine 3a for performing a retrieval service for amusement information, and a retrieval engine 3b for performing a retrieval service for all information fields.

As described referring to FIG. 7, the renewal information is produced by the push programs 6a and 6b, which are distributed to the information servers 2a, 2b and 2c, and is pushed together with data of the category.

The renewal information, which are pushed by the push programs 6a and 6b and received by the mediator, is selected in accordance with the category of the renewal information and is forwarded to the retrieval engines 3a and 3b. As a result, each of the retrieval engines 3a and 3b automatically receives a desired renewal information.

Thereafter, when the user 4 accesses the retrieval engines 3a and 3b via the Web browser 18 or the like to request a retrieval of information, the retrieval engines 3a and 3b retrieve information using the index renewed by the renewal information thus transmitted, and show the retrieved information to the user 4.

Next, there will be described a case in which a plurality of mediators 11 serves as a mediating apparatus in their cooperation. As such a cooperating scheme, there is considered, for example, schemes as set forth below.

As one of the schemes, there is a scheme that the condition decision section 13 refers to a table stored in another mediator 11. In this scheme, when the condition decision section 13 selects the renewal information or the push program, the condition decision section 13 accesses also the table management section 16 of another mediator 11 via the network or the like to obtain information of a table, and selects the renewal information or the push program using also the information of the table.

As another of the schemes, there is a scheme that the request transmission section 14 transmits a request message to another mediator 11. According to this scheme, an address of another mediator 11 is described in a table stored in the table storage section 15 in form of an address of renewal information and the like, so that the renewal information and the like are mediated via a plurality of mediators.

Next, details of operations of the respective structural components of the information providing system will be described with reference to flowcharts.

Figure 10:
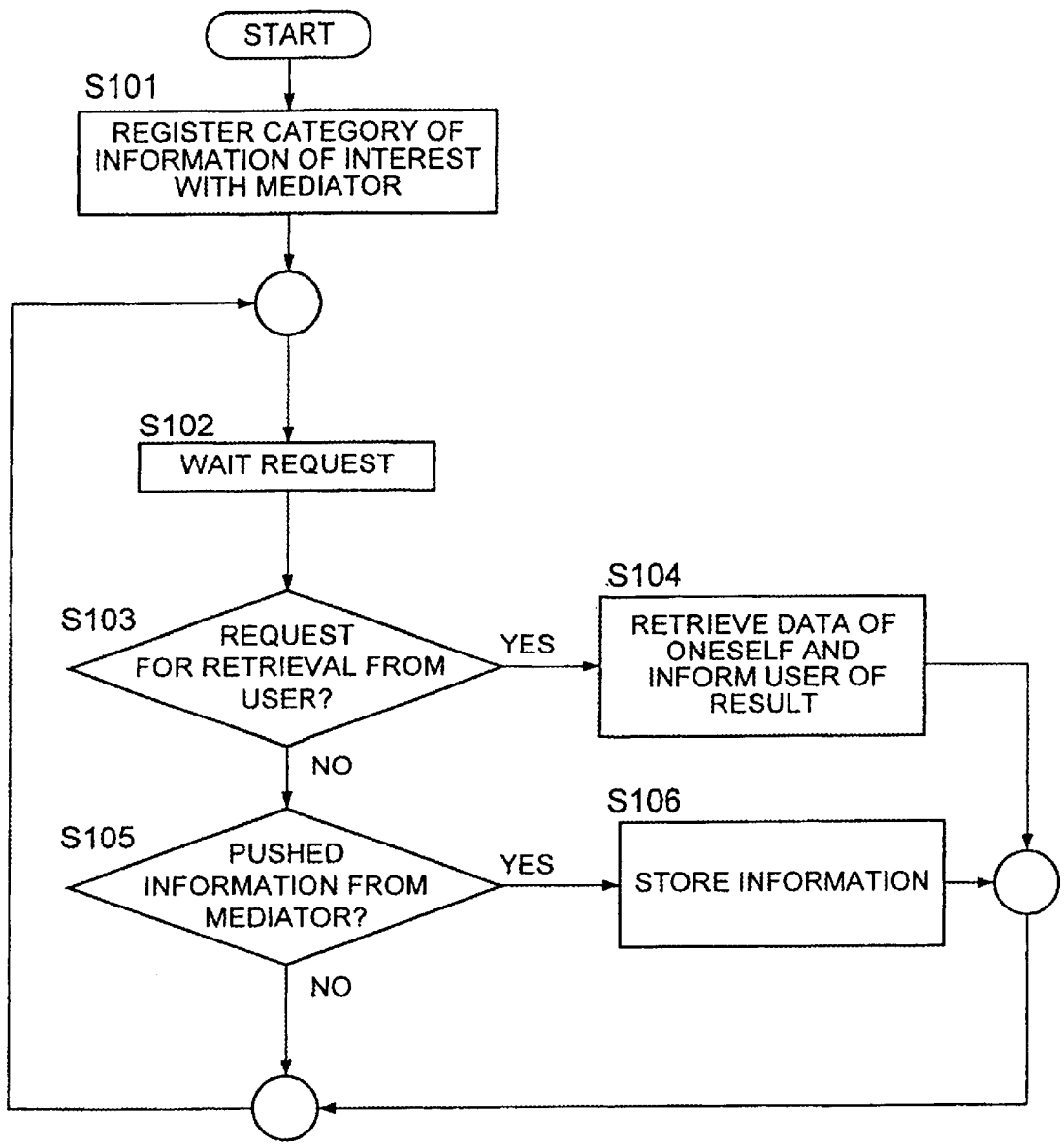
FIG. 10 is a flowchart useful for understanding an operation of a retrieval engine.

FIG. 10 is a flowchart useful for understanding an operation of a retrieval engine.

A retrieval engine first registers a category of the renewal information of interest with a mediator (step S101). Thereafter, the retrieval engine waits a request from the exterior (step S102). In the event that the retrieval engine receives a request for an information retrieval from a user (step S103: YES), the retrieval engine performs the retrieval using the index of oneself, and informs the user of the retrieval result (step S104). That is, the step S103 and the step S104 are an example of the information retrieval function referred to in the present invention. After the retrieval engine informs the user of the retrieval result, the program returns to the waiting of the request (step S102).

In the event that the retrieval engine receives from the mediator a message requiring storage of the renewal information pushed by the information server (step S105: YES), the retrieval engine stores the renewal information, and renews the index of oneself in accordance with the renewal information (step S106). That is, the step S105 and the step S106 are an example of the index construction function referred to in the present invention. After the retrieval engine renews the index, the program returns to the waiting of the request (step S102).

Figure 11:
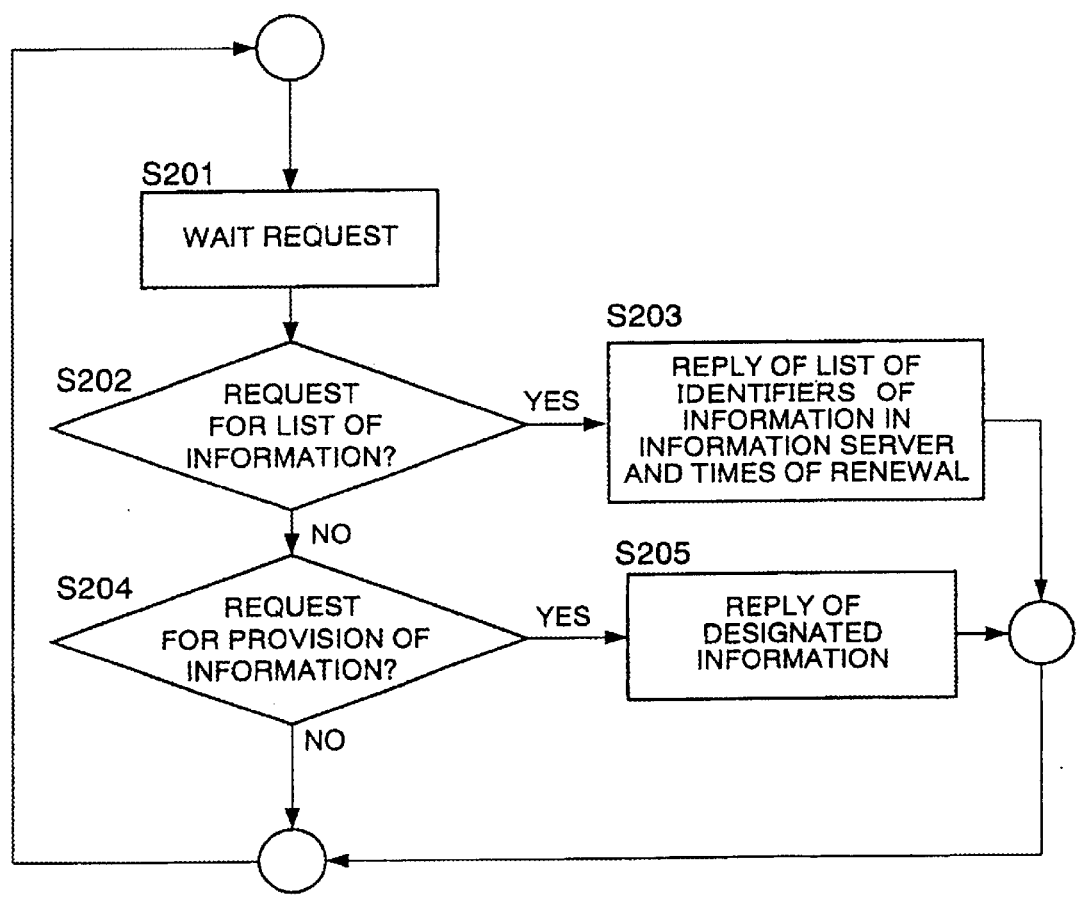
FIG. 11 is a flowchart useful for understanding an operation of an information server.

FIG. 11 is a flowchart useful for understanding an operation of an information server.

In FIG. 11, there is shown a flowchart useful for understanding an operation of a server main frame, excepting the platform and the push program, of the information server.

First, the information server waits a request from the exterior (step S201). In the event that the information server receives from the push program a request for provision of a list of information capable of being provided (step S202: YES), the information server produces and outputs in reply a list wherein identifiers, which discriminate mutually information messages capable of being provided, are associated with times wherein the information messages capable of being provided are renewed (step S203). Thereafter, the program returns to the waiting of the request (step S201).

In the event that the information server receives from a user or the like a request for provision of information (step S204: YES), the information server outputs in reply the designated information (step S205). That is, the step S204 and the step S205 are an example of the information providing function referred to in the present invention. After the information server outputs in reply the information, the program returns to the waiting of the request (step S201).

Figure 12:
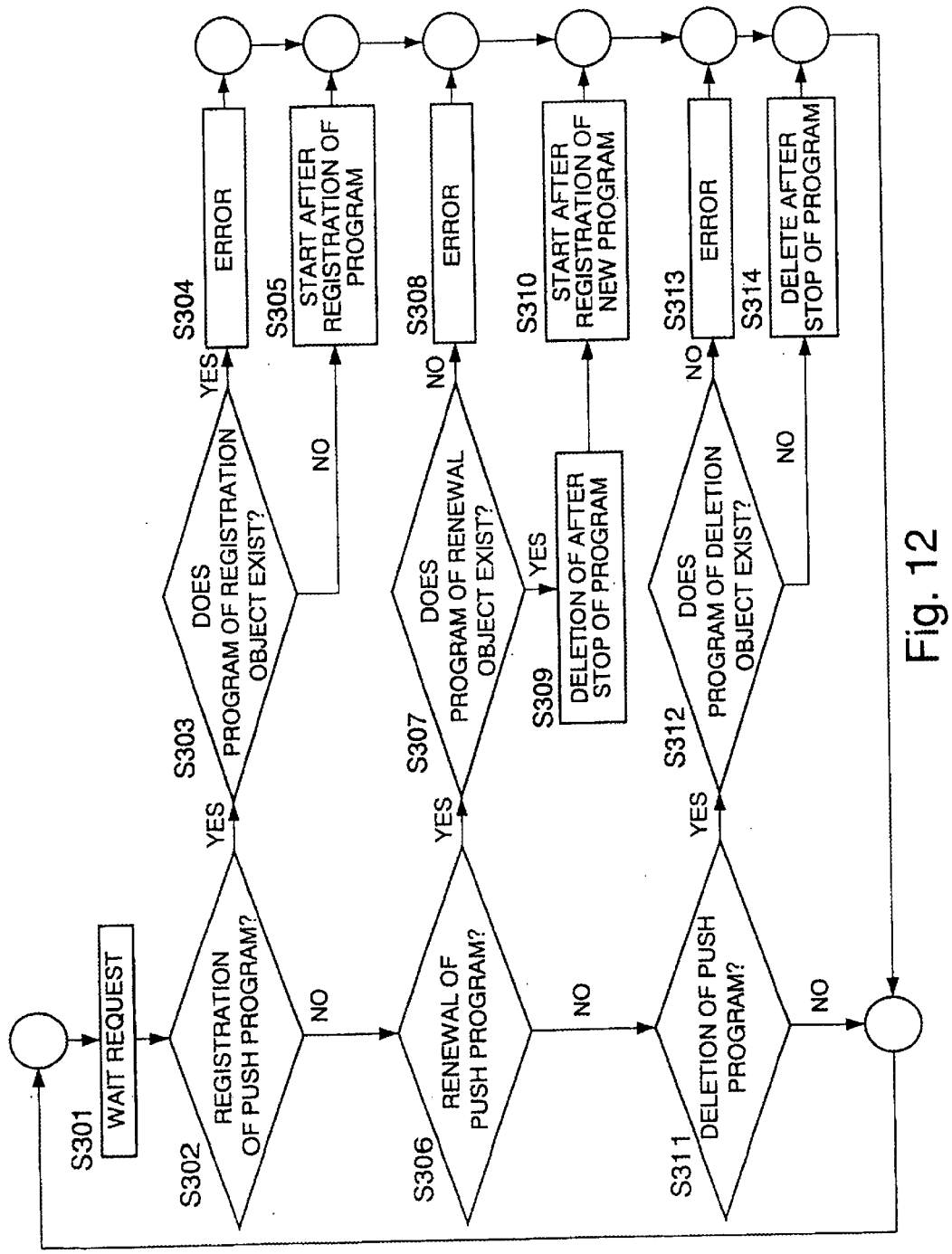
FIG. 12 is a flowchart useful for understanding an operation of a platform.

FIG. 12 is a flowchart useful for understanding an operation of a platform.

Also in FIG. 12, first, the platform waits a request from the exterior (step S301).

In the event that the platform receives from the exterior a request for registration of the push program (step S302: YES), it is determined whether the push program of the registration object exists already (step S303). When it is decided that the push program of the registration object exists already, an error message is issued (step S304), and the program returns to the waiting of the request (step S301). When it is decided that the push program of the registration object does not yet exist, the push program of the registration object is registered and activated (step S305), and the program returns to the waiting of the request (step S301).

In the event that the platform receives from the external a request for renewal of the push program (step S306: YES), it is determined whether the push program of the renewal object exists (step S307). When it is decided that the push program of the renewal object does not exist, an error message is issued (step S308), and the program returns to the waiting of the request (step S301). When it is decided that the push program of the renewal object exists, the push program of the renewal object, which exists already, is stopped and deleted (step S309), and the new push program is registered and activated (step S310). Thereafter, the program returns to the waiting of the request (step S301).

In the event that the platform receives from the external a request for deletion of the push program (step S311: YES), it is determined whether the push program of the deletion object exists (step S312). When it is decided that the push program of the deletion object does not exist, an error message is issued (step S313), and the program returns to the waiting of the request (step S301). When it is decided that the push program of the deletion object exists, the push program of the deletion object is stopped and deleted (step S314), and the program returns to the waiting of the request (step S301).

Figure 13:
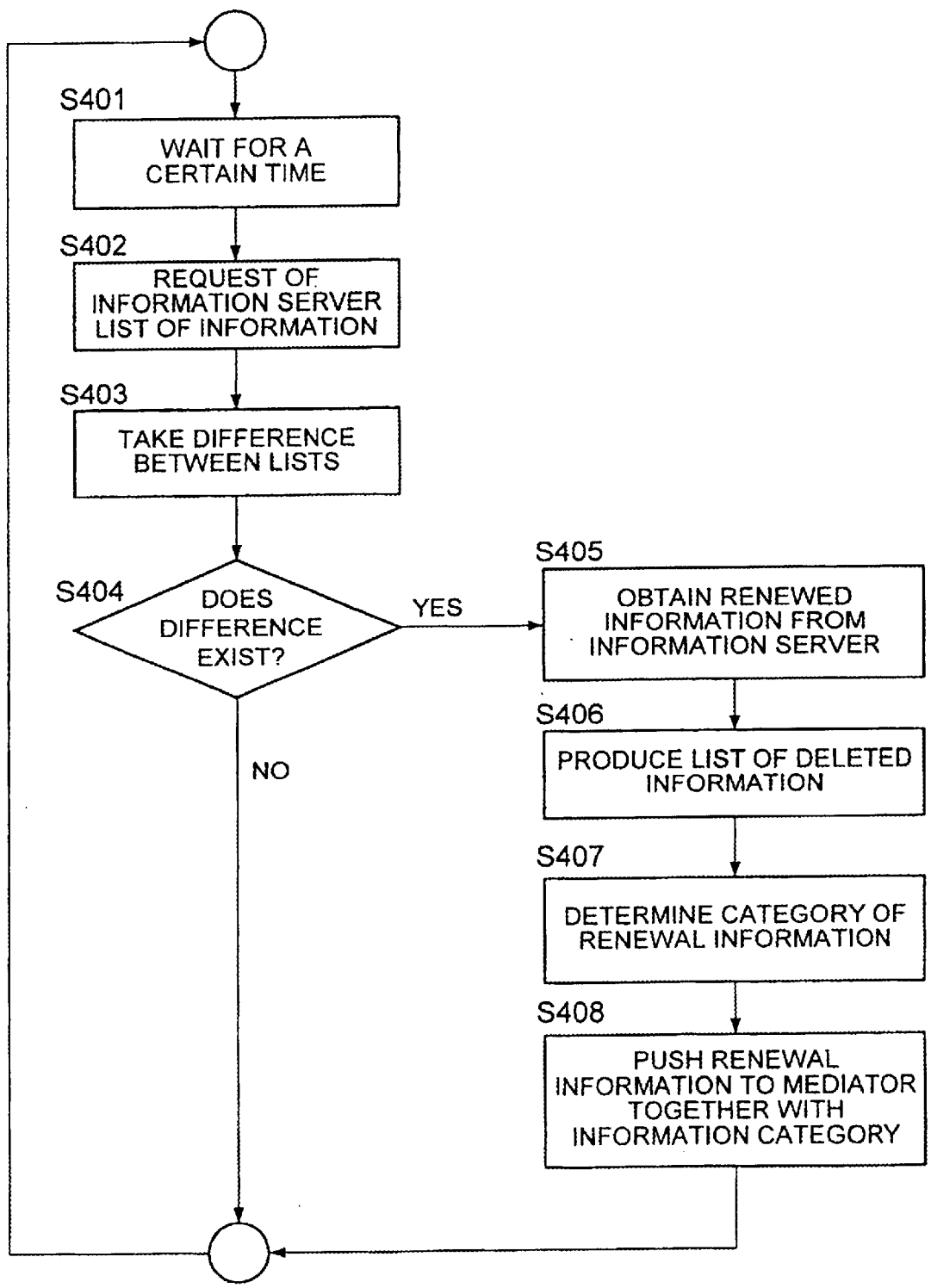
FIG. 13 is a flowchart useful for understanding a push program.

FIG. 13 is a flowchart useful for understanding a push program.

First, waiting for a certain time is provided (step S401). Next, a list of providing information is requested of the main frame of the information server (step S402). A difference between a list now replied from the main frame of the information server and a list previously replied from the main frame of the information server is determined in accordance with the request (step S403). When it is decided that no difference exists (step S404: NO), the program returns to the step S401 (waiting for a certain time).

In the event that a difference exists between the present list and the last list (step S404: YES), the providing information renewed between the last time and the present time is obtained from the main frame of the information server (step S405), so that a list of the providing information deleted between the last time and the present time is produced (step S406). Thus, the renewal information is produced. Thereafter, a category of the renewal information is determined (step S407), and data representative of the category is appended to renewal information and the renewal information is pushed toward the mediator (step S408). That is, the steps S405 to S408 are an example of the index output function referred to the present invention. After the renewal information is pushed, the program returns to the step S401 (waiting for a certain time).

Figure 14:
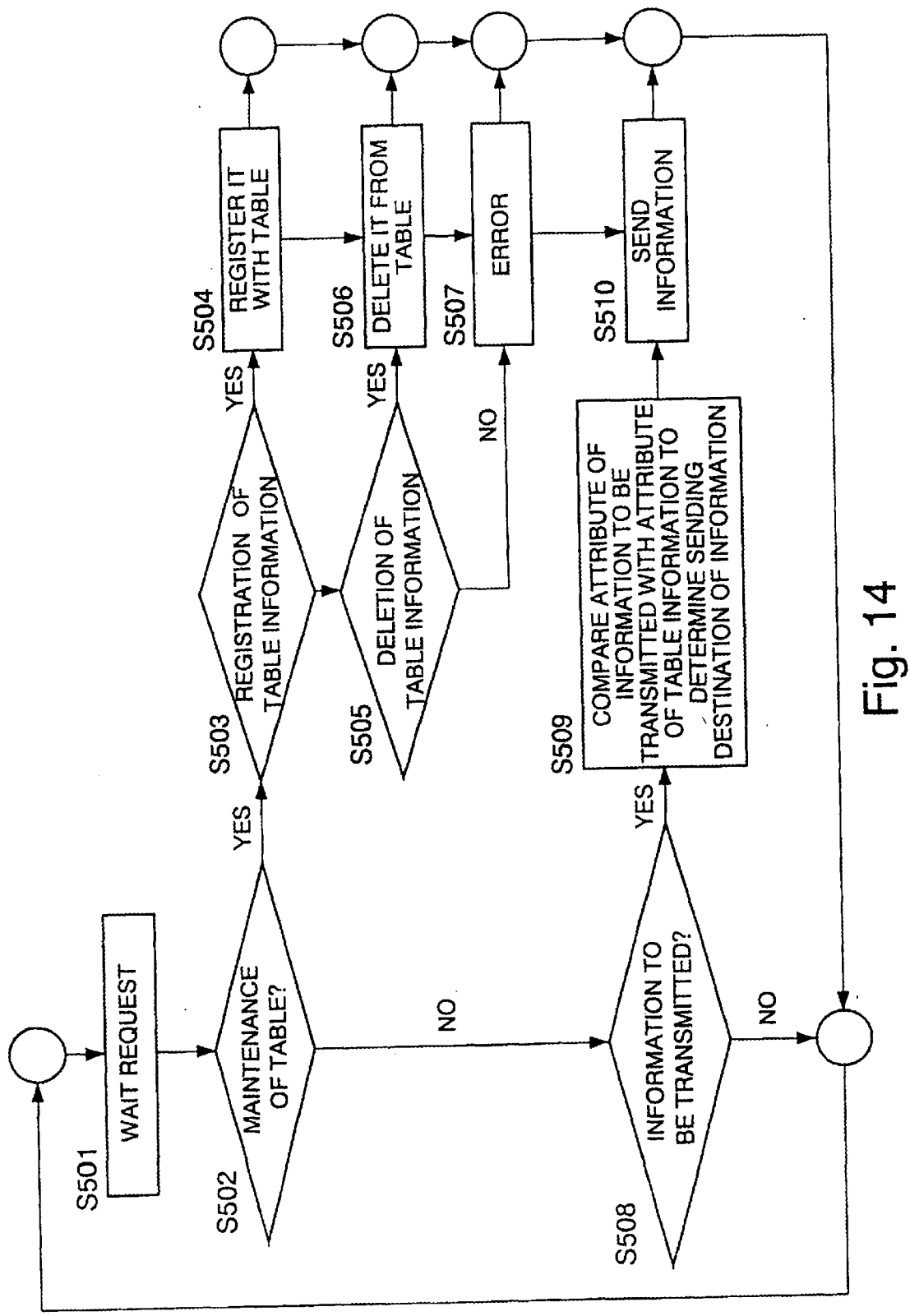
FIG. 14 is a flowchart useful for understanding an operation of a mediator.

FIG. 14 is a flowchart useful for understanding an operation of a mediator.

First, the mediator waits a request from the exterior (step S501).

In the event that the mediator receives from the exterior a request for maintenance (registration and deletion of the selection condition) of the table (step S502: YES), the mediator registers (step S504) the selection condition with the table in accordance with a request (step S503: YES) of registration of the table information (selection condition), or deletes (step S506) the selection condition from the table in accordance with a request (step S505: YES) of deletion of the table information (selection condition). Thereafter, the process returns to the step S501 (waiting a request). In the event that the mediator receives a request for maintenance other than the registration and the deletion (step S505: NO), the mediator issue an error message (step S507), and the process returns to the step S501 (waiting a request).

In the event that the mediator receives from the exterior a request message to be transmitted (step S508: YES), the mediator compares a category of the renewal information received together with the request message to be transmitted and an attribute of the push program received together with the request message to be transmitted with a category and an attribute in the table information (selection condition), respectively, to perform a selection of renewal information and the like and a decision of the transmission destination (step S509). The renewal information and the like are transmitted to the transmission destination (step S510), and the process returns to the step S501 (waiting a request).

Figure 15:
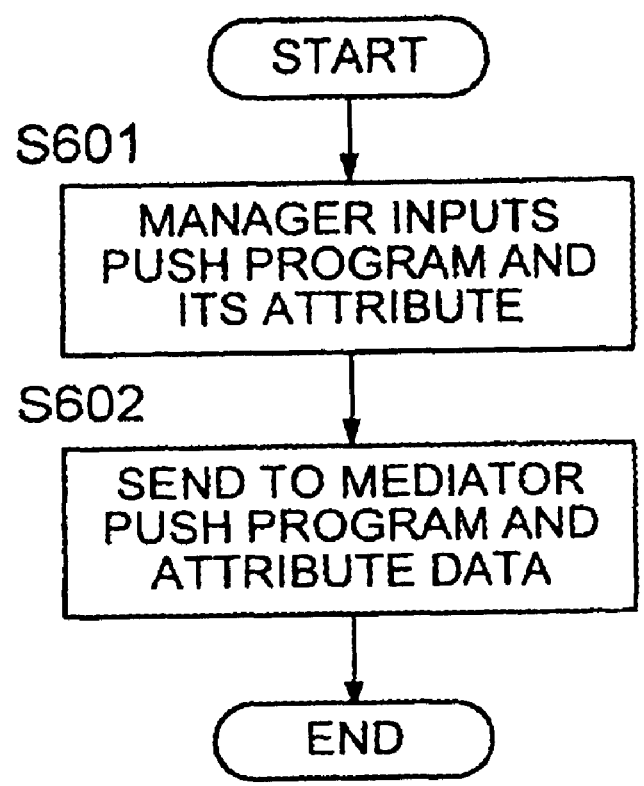
FIG. 15 is a flowchart useful for understanding a procedure in which a push program is distributed.

FIG. 15 is a flowchart useful for understanding a procedure in which a push program is distributed.

In FIG. 15, there is shown a procedure, which is considered by an engineer of a control center and a manager of a retrieval engine, when a push program is distributed on the information providing system according to the present embodiment.

The manager or the like enters a push program to be distributed and attribute data representative of the attribute of the push program to the retrieval engine or the like (step S601). Thereafter, the retrieval engine or the like, which receives the push program and the attribute data, transmits the push program and the attribute data to the mediator (step S602), and the distributing procedure is terminated.

Thus, an engineer of a control center and a manager of a retrieval engine can distribute the push programs without considering the individual information server.

According to the present embodiment as mentioned above, the information server pushes the renewal information. However, it is acceptable that the information source referred to in the present invention pushes an index representative of an information group capable of being provided in its entirety.

Further, according to the present embodiment as mentioned above, each the information server pushes the renewal information belonging to one category. However, it is acceptable that the information providing system of the present invention incorporates therein an information server, which pushes a plurality of pieces of renewal information belonging to each of a plurality of sorts of category. For example, it is acceptable that a plurality of homepages exists in an information server, and a push program of the information server produces and outputs the renewal information for each homepage. In this case, each homepage corresponds to the information source referred to in the present invention.

Furthermore, according to the present embodiment as mentioned above, the push program waits for a certain time whenever it pushes the renewal information. However, in the index output function of the information source referred to in the present invention, waiting for a certain time is not always needed, for example, it is acceptable that the push program pushes the renewal information in timing as occasion arises. Or alternatively, for example, it is acceptable that the main frame of the information server renews the providing information in accordance with a request for renewal of the providing information from a manager of the information server or an information provider and causes the push program to push the renewal information at the time of the renewal of the providing information. Thus, in the event that the main frame of the information server controls a timing of the push, as compared with the embodiments of the present invention as mentioned above, there is an advantage that a time deviation between a time of the renewal of the providing information and a timing of the push is small. On the other hand, there is a disadvantage that a degree of freedom of operation of the push program is small. Those advantage and disadvantage reside in trade-off relationships.

As mentioned above, according to the information providing system of the present invention, it is possible to incorporate a number of retrieval engines suppressing the burden of the retrieval engines and the information sources. Further, according to the mediating apparatus of the present invention, it is possible to construct such an information providing system.

Although the present invention has been explained with reference to the particular illustrative embodiments, it is not limited to those embodiments but only by the appended claims. It is to be appreciated that those skilled in the art can change or modify the embodiments without departing from the scope and spirit of the present invention.

What is claimed is:

1. An information providing system comprising:
   a plurality of information sources each having both an information providing function of providing an information item upon receipt of a request from a user's client for the same, and each having an index output function of outputting an individual index indexing information items that is capable of providing from its information providing function, where the index output function and the information providing function are separate functions;
   retrieval engines each having an index construction function of receiving at least one individual index outputted by the index output function of at least one information source and constructing a general index indexing information items capable of being provided by the least one information source, and having an information retrieval function of retrieving information for a user upon receipt of a user request to retrieve information by referring to the general index constructed by the index construction function; and
   a mediating apparatus intervening between said information sources and said retrieval engines and adapted to receive a plurality of individual indexes outputted from said plurality of information sources, the mediating apparatus deciding which received individual indexes to send to which retrieval engines based on comparing the received individual indexes with a predetermined index selection condition, and sending the selected individual indexes to corresponding decided retrieval engines for use in the index construction functions of said retrieval engines.

2. A mediating apparatus comprising:
   an index receiving section for receiving a plurality of individual indexes outputted by a plurality of information sources, each information source having both an information providing function of providing an information item to a user's client upon receipt of a user request for the same, and each information source having an index output function of outputting an individual index indexing information items that it is capable of providing from its information providing function;
   an index selection adapted to decide which one of plural retrieval engines is to receive an individual index by determining whether the outputted and received individual index satisfies a predetermined index selection condition; and
   an index sending section adapted to send the individual index to the decided retrieval engine for use in an index construction function, said index construction function receiving at least one individual index outputted by the index output function of at least one information source to construct a general index representative of information group capable of being provided by at least one information source, and an information retrieval function of retrieving information upon receipt of a request for retrieving information using the general index constructed by the index construction function.

3. A mediating apparatus according to claim 2, wherein said mediating apparatus further comprises an index selection condition storage section for storing the index selection condition in association with said decided retrieval engine upon receipt of a request for registration of the index selection condition by said retrieval engine,
   said index selection section selects an individual index satisfying an index selection condition stored in said index selection condition storage section, and
   said index sending section sends the individual index selected by said index selection section to a retrieval engine associated with the index selection condition used in selection of the individual index, of the plurality of retrieval engines.

4. A mediating apparatus according to claim 2, wherein said information sources each has, as the index output function, a function of receiving a push program defining a method of producing and outputting the individual index to produce and output the individual index in accordance with the method defined by the push program, and
   said mediating apparatus further comprises a program receiving section for receiving the push program,
   a program selection section for selecting a push program satisfying a predetermined program selection condition from among the push programs received by said program receiving section, and
   a program sending section for sending the push program selected by said program selection section to said information source for use in the index output function.

5. A mediating apparatus according to claim 4, wherein said mediating apparatus further comprises a program selection condition storage section for storing the program selection condition in association with said information source upon receipt of a request for registration of the program selection condition by said information source,
   said program selection section selects a push program satisfying a program selection condition stored in said program selection condition storage section, and
   said program sending section sends the push program selected by said program selection section to an information source associated with the program selection condition used in selection of the push program.

6. A method of mediating index information exchanged between information source servers and retrieval engines that index the information source servers, the method comprising:
   maintaining, at a mediator separate from and between the information source servers and the retrieval engines, information categories of the information source servers and of the retrieval engines; and
   based on the information categories, deciding which index information to distribute to which retrieval engines, where the indexing information is pushed to the mediator from the information source servers, and where the pushed indexing information indexes information providable by the information source servers to users upon request of clients of the users.

7. A method according to claim 6, further comprising:
based on the indicia, distributing from the mediator to the information source servers index-pushing information used by the information source servers to push the indexing information.

8. A system for mediating information source servers and retrieval engines for retrieving information from the information source servers, where the information source servers serve information to user clients over a network responsive to requests of the users, where the retrieval engines store index information indexing the information served by the information source servers, and where the retrieval engines use the index information to search the information responsive to user requests, the system comprising:
a mediator, separate from the information source servers and retrieval engines, the mediator being capable of mediating distribution of a push-program and mediating distribution of index information pushed from the push-program after the push-program has been distributed by the mediator;
the mediating distribution of a push-program comprising:
receiving a push-program capable of pushing from an information server index information of that server,
deciding which of the information source servers are suitable to the push-program, and
pushing the push-program to the suitable information source servers; and
the mediating distribution of pushed index information pushed by the push-program comprising:
receiving index information of an information source server pushed by a push-program of the information source server,
deciding one or more of the retrieval engines that are suitable to receive the pushed index information, and
sending the pushed index information to the one or more suitable retrieval engines.

9. A method, comprising:
using a mediator program to push different push-programs to different types of information source servers;
executing the different push-programs on the different types of information source servers, where each push-program received by an information source server executes and detects changes in information provided to user clients by its respective information source server by comparing current information available from the respective information source server with previous information available from the respective information source server, and where each push-program responds to detected changes by pushing to the mediator program indicia of the differences; and
sending the indicia of the differences from the mediator program to retrieval engines, where the retrieval engines provide retrieval information to user clients where it is to be displayed and used by the users for retrieving information at the information source servers based on the indicia received from the mediator program.

10. A method according to claim 9, wherein the indicia are directed, by the mediator program, to particular web retrieval servers according to content of the indicia.

11. A method according to claim 9, wherein the indicia comprise index information that indicates locations of information items provided by the web servers and referred to in the web pages for retrieving the same.

12. A method for use in a system comprising internet search engines and web servers, where the web servers serve content via web pages sent to web clients, where the search engines have search indexes that index the content of the web servers, and where the web clients submit search requests to the search engines, where a search engine responds to a web client's search request by searching its search index and returning to the requesting web client links to web server content found by the index search, where the search indexes of the respective search engines are based on web server content indexes of the content of respective individual web servers received by the search engines, the method comprising:
at a mediator between the search engines and the web servers: receiving over a network the content indexes of the respective web servers, making decisions at the mediator to determine which content indexes should be routed to which search engines, and routing the content indexes to the search engines in accordance with the decisions, where the decisions are based on the content indexes or information received in association therewith.

13. A method according to claim 9, wherein the user clients comprise document or web browsers, wherein the retrieval information comprises a web page, and wherein the information source servers comprise web servers, an.

14. A method according to claim 10, wherein the user clients comprise document or web browsers, wherein the retrieval information comprises a web page, and wherein the information source servers comprise web servers.

15. A method according to claim 11, wherein user clients comprise document or web browsers, wherein the retrieval information comprises a web page, and wherein the information source servers comprise web servers.

* * * * *

UNITED STATES PATENT AND TRADEMARK OFFICE
CERTIFICATE OF CORRECTION

PATENT NO.       : 7,072,907 B2
APPLICATION NO.  : 09/808357
DATED            : July 4, 2006
INVENTOR(S)      : Hiroki Ichiki et al.

It is certified that error appears in the above-identified patent and that said Letters Patent is hereby corrected as shown below:

Column 15, line 28, change "items that" to --items that it--;
            line 54, change "section for receiving" to --section adapted to receive--; and
            line 64, change "selection adapted" to --selection section adapted--.
Column 18, line 12, after "particular" delete "web";
            line 13, change "retrieval servers" to --retrieval engines--;
            line 16, change "web servers" to --information source servers--;
            line 17, change "web pages" to --retrieval information--;
            line 22, after "web servers" delete "and";
            line 40, after "wherein" delete "the";
            line 43, after "web servers" delete ", an"; and
            line 44, after "wherein" delete "the".

Signed and Sealed this

Twenty-first Day of November, 2006

JON W. DUDAS
*Director of the United States Patent and Trademark Office*